United States Patent
Todd

(10) Patent No.: US 12,502,763 B2
(45) Date of Patent: Dec. 23, 2025

(54) TISSUE PAPER RETRIEVING DEVICE

(71) Applicant: Anthony Todd, South Holland, IL (US)

(72) Inventor: Anthony Todd, South Holland, IL (US)

(*) Notice: Subject to any disclaimer, the term of this patent is extended or adjusted under 35 U.S.C. 154(b) by 895 days.

(21) Appl. No.: 17/744,122

(22) Filed: May 13, 2022

(65) Prior Publication Data
US 2023/0364775 A1    Nov. 16, 2023

(51) Int. Cl.
*B25J 1/04*   (2006.01)
*B25J 1/02*   (2006.01)
*B25J 15/08*   (2006.01)

(52) U.S. Cl.
CPC ........ *B25J 1/02* (2013.01); *B25J 15/08* (2013.01)

(58) Field of Classification Search
CPC .... B25J 1/04; B25J 15/106; E01H 2001/1293
See application file for complete search history.

(56) References Cited

U.S. PATENT DOCUMENTS

| | | |
|---|---|---|
| D428,316 S | 7/2000 | Mac Neil |
| 6,272,716 B1 | 8/2001 | Thornton |
| 6,640,667 B1 | 11/2003 | Pomerantz |
| 7,083,210 B2 | 8/2006 | Muruamatsu |
| 2006/0155168 A1* | 7/2006 | Pease ............... G02B 23/2476 600/109 |
| 2007/0085358 A1* | 4/2007 | Robinson ............. H01J 9/003 294/111 |
| 2007/0241573 A1 | 10/2007 | Teng |
| 2011/0170281 A1 | 7/2011 | Shih |
| 2014/0008930 A1 | 1/2014 | James |
| 2020/0383557 A1 | 12/2020 | Sedlacek |

FOREIGN PATENT DOCUMENTS

WO    WO2019113474    6/2019

* cited by examiner

*Primary Examiner* — Bradley Duckworth

(57) ABSTRACT

A tissue paper retrieving device for snatching tissue paper includes a handle having an ergonomic squeeze grip. The handle has a palm surface and a finger surface. A battery is positioned within a battery compartment. A button is positioned on the palm surface of the handle. A motor is positioned within an interior of the handle. The motor is in mechanical communication with the ergonomic squeeze grip. An arm protrudes out from an end of the finger surface of the handle. Each claw of a plurality of claws has a base end and a free end. The free end of each of the claws is positioned facing an axial line of the arm. The free end of each of the claws is moves toward the axial line when in positioned in the arm.

14 Claims, 6 Drawing Sheets

TISSUE PAPER RETRIEVING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR Not Applicable

BACKGROUND OF THE INVENTION

(1) Field of the Invention

The disclosure relates to grippable arm devices and more particularly pertains to a new grippable arm device for snatching tissue paper.

(2) Description of Related Art Including Information Disclosed Under 37 CFR 1.97 and 1.98

The prior art relates to grippable arm devices. The prior art relates to a variety of grippable arm devices used to seize a variety of items using a catching mechanism. Known prior art lacks a grippable arm device having a manual and motorized functionality being configured for seizing tissue paper.

BRIEF SUMMARY OF THE INVENTION

An embodiment of the disclosure meets the needs presented above by generally comprising a handle having an ergonomic squeeze grip. The handle has a palm surface and a finger surface. The handle has an interior. The interior defines a space for an element to be positioned within. A battery is a disposable battery positioned within a battery compartment. A button is positioned on the palm surface of the handle. The button is an actuator. A motor is positioned within the interior of the handle. The motor is in mechanical communication with the ergonomic squeeze grip. An arm protrudes out from an end of the finger surface of the handle. Each claw of a plurality of claws has a base end and a free end. The free end of each of the claws is positioned facing an axial line of the arm. The free end of each of the claws is configured for moving toward the axial line when in positioned in the arm.

In another embodiment, a method of retrieving tissue paper using an arm includes engaging the thumb of the user with a button of a handle to actuate a motor. The motor mechanically pulls a plurality of claws to retrieve a piece of tissue paper. Subsequently, releasing the thumb of the user from the button to let go of the tissue paper from the plurality of claws. Furthermore, engaging the fingers of the user with an ergonomic squeeze grip of the handle to mechanically pull the plurality of claws to retrieve the piece of tissue paper. Subsequently, releasing the fingers of the user from the ergonomic squeeze grip too let go of the tissue paper from the plurality of claws.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
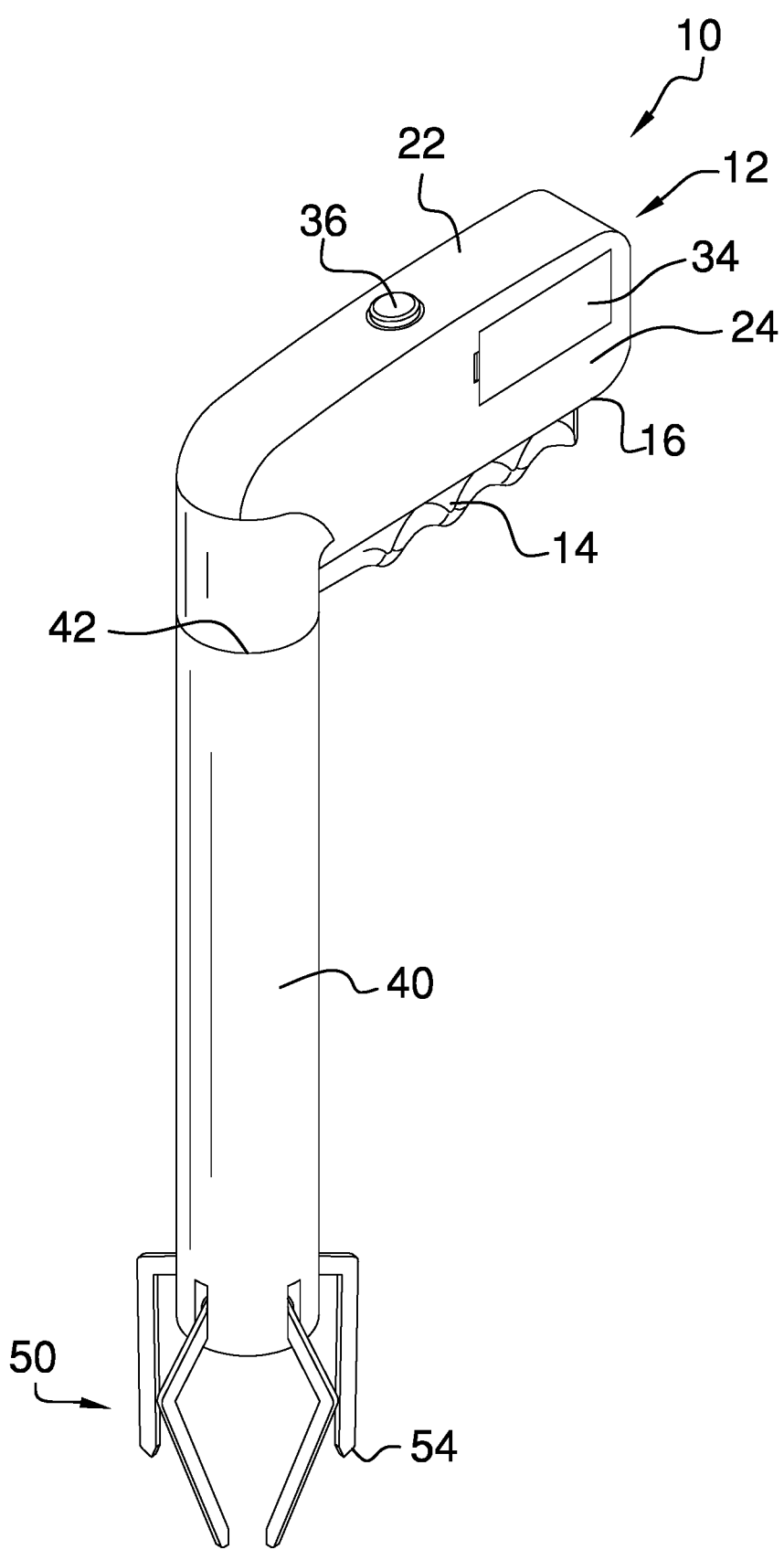
FIG. 1 is an isometric view of a tissue paper retrieving device according to an embodiment of the disclosure.
Figure 2:
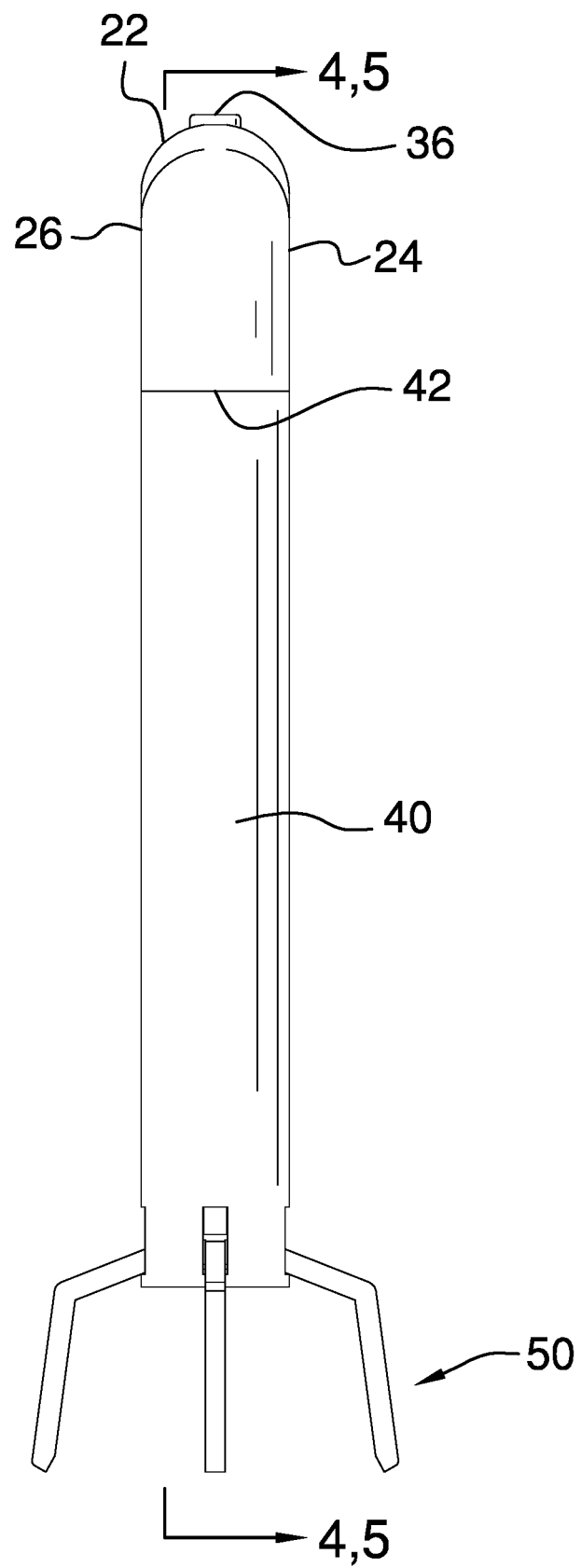
FIG. 2 is a front view of an embodiment of the disclosure.
Figure 3:
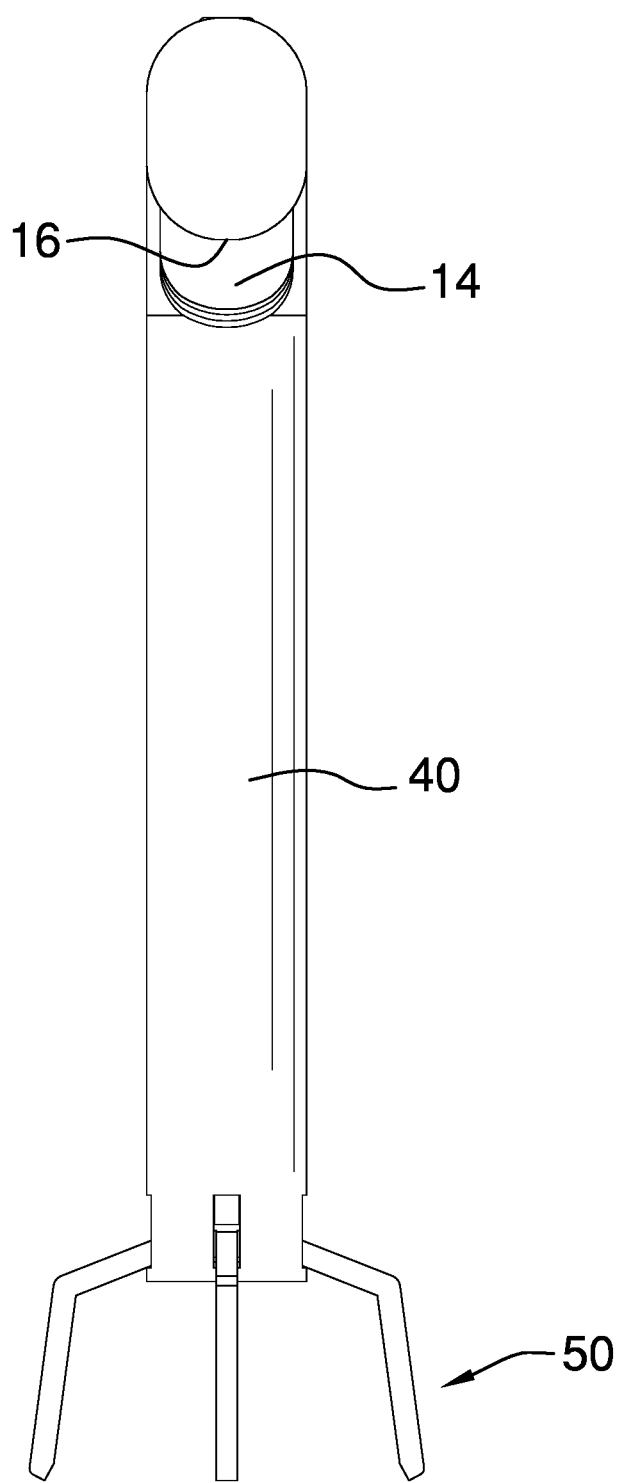
FIG. 3 is a back view of an embodiment of the disclosure.

With reference now to the drawings, and in particular to FIGS. 1 through 6 thereof, a new grippable arm device embodying the principles and concepts of an embodiment of the disclosure and generally designated by the reference numeral 10 will be described.

As best illustrated in FIGS. 1 through 6, the tissue paper retrieving device 10 generally comprises a handle 12. The handle 12 has an ergonomic squeeze grip 14 positioned on a finger surface 16 of the handle 12. The ergonomic squeeze grip 14 is configured for clasping by the fingers 20 of the user 18 to push the ergonomic squeeze grip 14 inward towards the handle 12. Additionally, the handle 12 has a palm surface 22 positioned parallel relative to the finger surface 16. The handle 12 has a first side 24 and a second side 26. The first 24 and second 26 sides are positioned perpendicular relative to the palm 22 and finger 16 surfaces. The handle 12 has an interior 28 defining a space for an element to be positioned within.

A battery 30 is positioned within a battery compartment 32 of the handle 12. The battery compartment 32 is positioned on the first side 24 of the handle 12. The battery 30 is a disposable battery and is configured for being replaced when the battery 30 can no longer provide electric power to the handle 12. The battery compartment 32 has a door 34 being configured for enclosing or exposing the battery compartment 32. The user 18 can access and replace the battery 30 of the handle 12 by opening the door 34 to the battery compartment 32.

A button 36 is positioned on the palm surface 22 of the handle 12. The button 36 is an actuator and is in electric communication with the battery 30. The button 36 is configured for being pressed inward towards the handle 12 to turn on and off a motor 38. The motor 38 is positioned within the interior 28 of the handle 12 and is in electric communication with the button 36. The motor 38 is in mechanical communication with the ergonomic squeeze grip 14 wherein the motor 38 can engage with the ergonomic squeeze grip 14 without the fingers 20 of the user 18.

An arm 40 protrudes out from an end 42 of the finger surface 16 of the handle 12. The arm 40 has a tubular shaped body whereby the arm 40 has a hollowed interior. An end 44 of the ergonomic squeeze grip 14 protrudes through the arm 40 wherein defining a protrusion 46. The protrusion 46 has an end 48 where a plurality of claws 50 is positioned. Each of the claws 50 has a curvature shape. Furthermore, each of the claws 50 has a base end 52 and a free end 54. The base end 52 of each of the claws 50 is coupled to the end 48 of the protrusion 46 of the arm 40 by a pivot joint. The plurality of claws 50 is positioned in a circular pattern around the arm 40.

Figure 4:
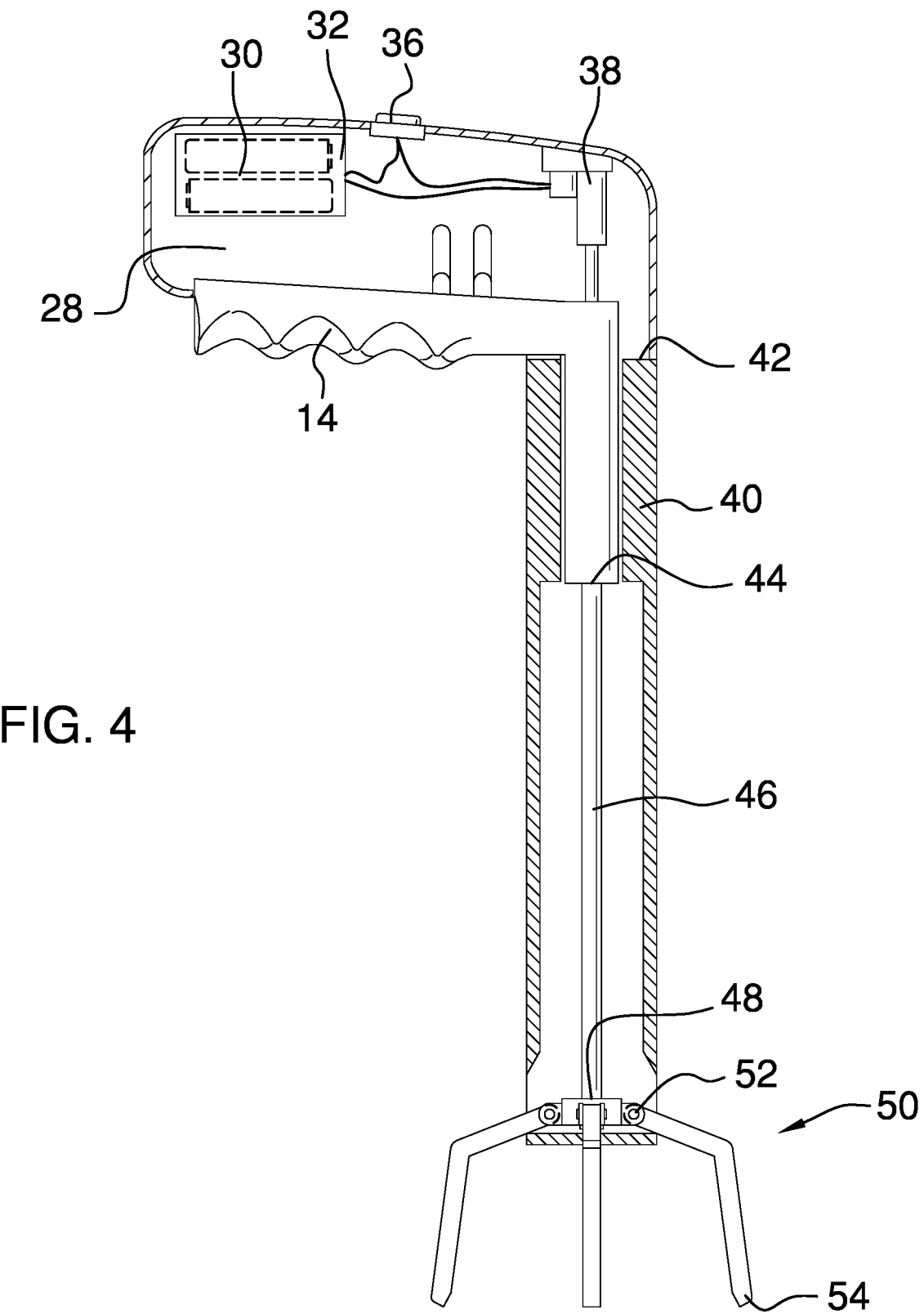
FIG. 4 is a cross-sectional view of an embodiment of the disclosure taken from FIG. 2 of Line 4-4.
Figure 5:
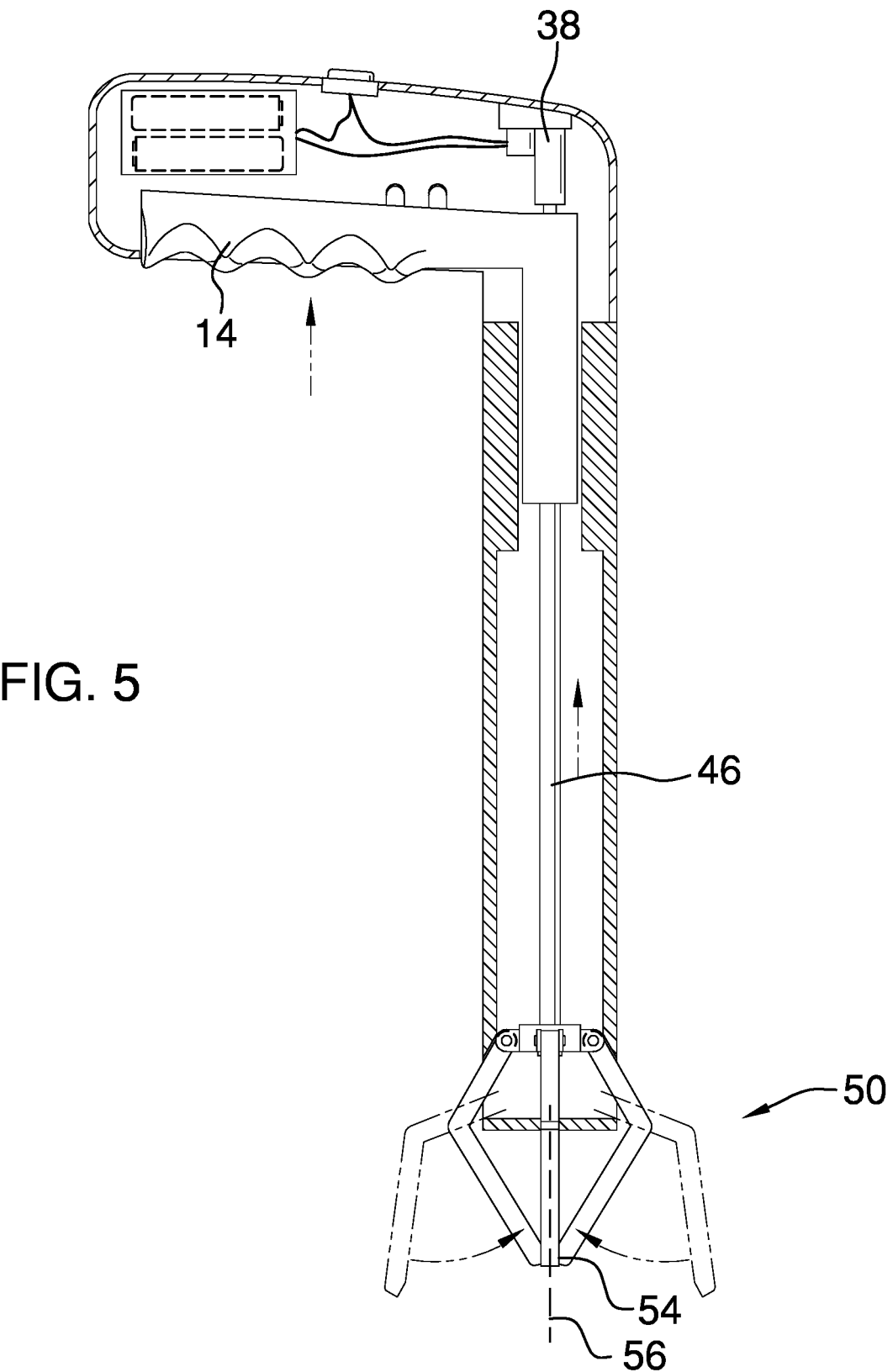
FIG. 5 is a cross-sectional view of an embodiment of the disclosure taken from FIG. 2 of Line 5-5.
Figure 6:
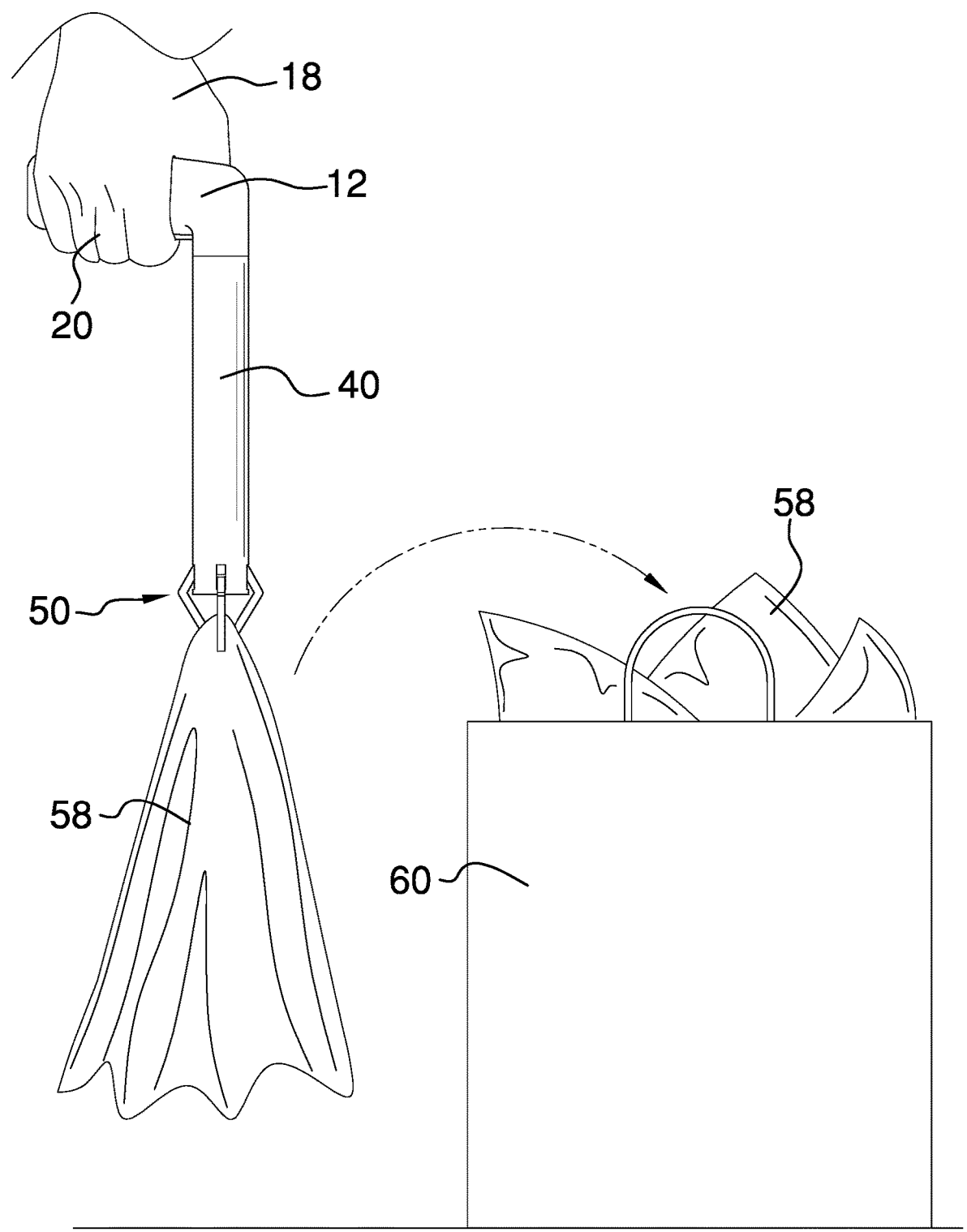
FIG. 6 is an in-use view of an embodiment of the disclosure.

Furthermore, the plurality of claws 50 is configured for positioning from out of the arm 40 to within the arm 40. The plurality of claws 50 is biased for positioning out of the arm 40, as shown in FIG. 4. The free end 54 of each of the claws 50 is positioned facing an axial line 56 of the arm 40. The free end 54 of each of the claws 50 is configured for moving toward the axial line 56 when positioned within the arm 40.

In use, the plurality of claws 50 is positioned on a piece of tissue paper 58. The thumb of the user 18 engages with the button 36 of the handle 12 to actuate the motor 38. The motor 38 mechanically pulls the ergonomic squeeze handle 14 wherein retracting the protrusion 46. The plurality of claws 50 retracts within the arm 40 to enclose the free end 54 of each of the claws 50 to abut each other. Each of the claws 50 entraps the tissue paper 58 to transport the tissue paper 58 to a gift bag 60. Additionally, the fingers 20 of the user 18 can clasp the ergonomic squeeze grip 14 to manually pull the protrusion 46 within the arm 40 whereby engaging with the plurality of claws 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tissue retriever arm device configured for snatching a piece of tissue paper to be positioned within a gift bag, The device comprises:
   a handle having an ergonomic squeeze grip, the handle having a palm surface and a finger surface, the handle having an interior, the interior defining a space for an element to be positioned within;
   a battery being a disposable battery, the battery being positioned within a battery compartment;
   a button being positioned on the palm surface of the handle, the button being an actuator;
   a motor being positioned within the interior of the handle, the motor being in mechanical communication with the ergonomic squeeze grip;
   an arm protruding out from an end of the finger surface of the handle; and
   a plurality of claws, each of the claws having a base end and a free end, the free end of each of the claws being positioned facing an axial line of the arm, the free end of each of the claws being configured for moving toward the axial line when positioned within the arm.

2. The tissue retriever arm device of claim 1, further comprising the ergonomic squeeze grip being positioned on the finger surface.

3. The tissue retriever arm device of claim 1, further comprising the handle having a first side and a second side, the first and second sides being positioned perpendicular relative to the palm and finger surfaces.

4. The tissue retriever arm device of claim 3, further comprising the battery compartment being positioned on the first side of the handle.

5. The tissue retriever arm device of claim 1, further comprising the battery compartment having a door, the door of the battery compartment being configured for enclosing or exposing the battery compartment.

6. The tissue retriever arm device of claim 1, further comprising the button being in electric communication with the battery.

7. The tissue retriever arm device of claim 1, further comprising the arm having a tubular shaped body.

8. The tissue retriever arm device of claim 1, further comprising an end of the ergonomic squeeze grip protruding through the arm defining a protrusion.

9. The tissue retriever arm device of claim 8, further comprising the base end of each of the claws being coupled to an end of the protrusion of the arm by a pivot joint.

10. The tissue retriever arm device of claim 1, further comprising each of the claws having a curvature shape.

11. The tissue retriever arm device of claim 1, further comprising the plurality of claws being positioned in a circular pattern around the arm.

12. The tissue retriever arm device of claim 1, further comprising the plurality of claws being configured for positioning from out of the arm to within the arm, the plurality of claws being biased for positioning out of the arm.

13. A tissue retriever arm device configured for snatching a piece of tissue paper to be positioned within a gift bag, The device comprises:
   a handle having an ergonomic squeeze grip, the handle having a palm surface and a finger surface, the ergonomic squeeze grip being positioned on the finger surface, the handle having a first side and a second side, the first and second sides being positioned perpendicular relative to the palm and finger surfaces, the handle having an interior, the interior defining a space for an element to be positioned within;

a battery being a disposable battery, the battery being positioned within a battery compartment, the battery compartment being positioned on the first side of the handle, the battery compartment having a door, the door of the battery compartment being configured for enclosing or exposing the battery compartment;

a button being positioned on the palm surface of the handle, the button being an actuator, the button being in electric communication with the battery;

a motor being positioned within the interior of the handle, the motor being in electric communication with the button, the motor being in mechanical communication with the ergonomic squeeze grip;

an arm protruding out from an end of the finger surface of the handle, the arm having a tubular shaped body, an end of the ergonomic squeeze grip protruding through the arm defining a protrusion; and a plurality of claws, each of the claws having a curvature shape, each of the claws having a base end and a free end, the base end of each of the claws being coupled to an end of the protrusion of the arm by a pivot joint, the plurality of claws being positioned in a circular pattern around the arm, the free end of each of the claws being positioned facing an axial line of the arm, the plurality of claws being configured for positioning from out of the arm to within the arm, the plurality of claws being biased for positioning out of the arm, the free end of each of the claws being configured for moving toward the axial line when positioned within the arm.

14. A method of retrieving tissue paper using an arm, the method including the step of:

engaging the thumb of the user with a button of a handle to actuate a motor, the motor mechanically pulls a plurality of claws to retrieve a piece of tissue paper, releasing the thumb of the user from the button to let go of the tissue paper from the plurality of claws; and engaging the fingers of the user with an ergonomic squeeze grip of the handle to mechanically pull the plurality of claws to retrieve the piece of tissue paper, releasing the fingers of the user from the ergonomic squeeze grip to let go of the tissue paper from the plurality of claws.

\* \* \* \* \*